April 24, 1951  E. D. RAPISARDA  2,550,379
GAS OPERATED SPRAY OUTFIT
Filed Sept. 29, 1945

INVENTOR
EDWARD D. RAPISARDA
BY Chapin & Neal.
ATTORNEYS

Patented Apr. 24, 1951

2,550,379

UNITED STATES PATENT OFFICE 2,550,379

GAS-OPERATED SPRAY OUTFIT

Edward D. Rapisarda, Agawam, Mass., assignor to Gilbert & Barker Manufacturing Company, West Springfield, Mass., a corporation of Massachusetts Application September 29, 1945, Serial No. 619,373

1 Claim. (Cl. 299—95)

This invention relates to improvements in devices for spraying insecticide and has particular reference to so-called bomb type spraying devices of this general type which are capable of use with aerosol sprays. The invention also permits the use with this type of spray of a replaceable cartridge containing the insecticide together with pressure fluid. A further object is to avoid loss of pressure in the device in case it is tilted accidentally to such a position that gas under pressure may escape without forcing liquid ahead of it.

While the use of this apparatus is not restricted to any particular insecticide it does have particular utility in connection with the so-called aerosol sprays. These sprays typically contain an insecticide in an oil vehicle such as kerosene which is held under heavy pressure by a preferably liquefied gaseous pressure medium such as freon (dichloro-difluoro methane). When liquid of this type is forced out of a small capillary tube the contents issue into the air as a fine mist which will float in still air for some hours. No attempt is usually made with this type of spray to cover specific surfaces as is the case with garden sprays, but instead a small quantity of a fine mist is emitted into the air of a room and allowed to disperse throughout the entire space. The time of spraying is usually only a few seconds as a sufficient quantity of the insecticide will be emitted in aerosol form during this period, remaining in suspension for several hours.

The invention will now be described in connection with the accompanying drawings, in which.

Figure 1:
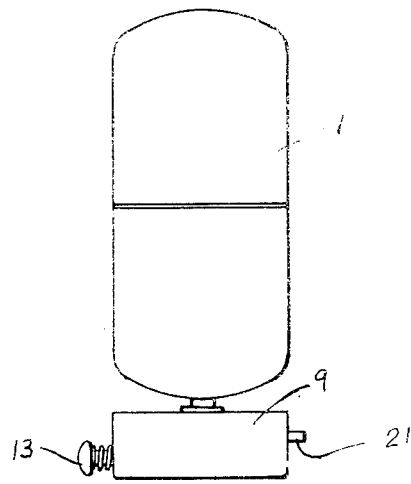
Fig. 1 is a side elevation of the device.
Figure 2:
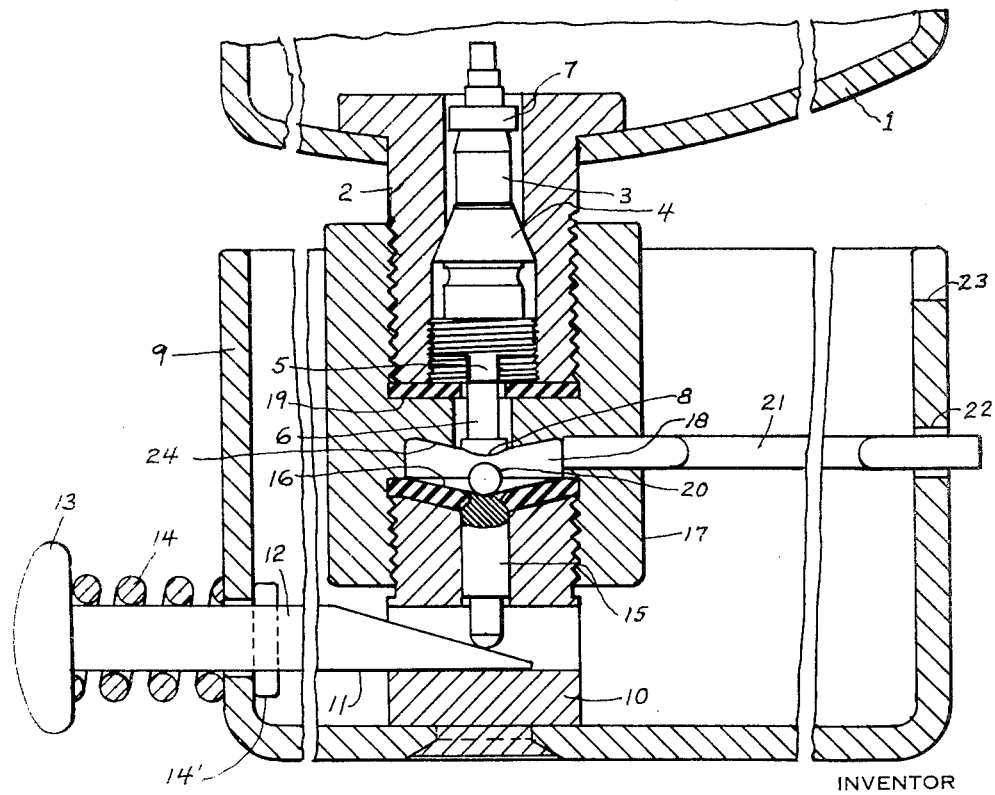
Fig. 2 is a median section through a portion thereof on an enlarged scale.

1 represents a pressure cylinder or cartridge designed to withstand high pressure and containing as received by the user a quantity of liquid carrying the insecticide and a gas, preferably liquefied under pressure, which serves to eject and atomize the liquid. The cylinder is sealed by a perforated plug 2, brazed or otherwise secured in place, which in turn is closed by a poppet valve 3 preferably in the form of an ordinary tire valve. As is well known, such valves have a conical gasket 4 contacting a reduced part of the bore in the plug 2 when the valve body is screwed in place, which may be done by means of lugs 5. The stem of the poppet member, or valve insides as they are generally called, is shown at 6, and the valve member is shown at 7 in position to close the passage through the body of the valve.

The valve may be of standard tire valve construction although it is preferred to round the lower end of the valve stem as indicated at 8.

The parts as thus far described comprise the cartridge in the form received by the user, who has a standard operating mechanism into which cartridges may be screwed as needed. This operating mechanism may be mounted in a cup member 9 having a plug 10 riveted or otherwise secured to its bottom. This plug is transversely perforated to receive the rounded shank 11 of a lifter cam having a wedge shaped inner end and a projecting portion 12 preferably square in cross section which passes through a hole in the cup and terminates in a knob 13. A spring 14 between this knob and the outer wall of the cup maintains the lifter cam in its outward position as limited by a collar 14'.

Riding on the inner slanting end of the lifter cam is a plunger 15 which is preferably arranged as will be described so that it can open the stem of the valve 3 only when the device as a whole is held in substantially vertical position. Were the device to be operated without being in vertical position it might be possible, particularly when the contents of the cylinder became nearly exhausted, that liquid would flow over to one side of the cylinder so as not to be in a position to pass out through the valve, allowing the gas which fills the space in the cylinder not occupied by the liquid to escape. This would result in a loss of pressure within the cylinder and inability to eject the last remaining quantities of liquid.

To insure a substantially vertical position of the apparatus a disc 16, preferably of rubber or other flexible material, is secured as by vulcanizing to the top of the plunger 15, which may be grooved as shown to insure a firm grip on the disc. This disc provides a flexible dished seat above the plunger and is held between the plug 10 and a shoulder on a sleeve 17 which is threaded both to the plug 10 and to the plug 2. This shoulder is located so as to provide an internal chamber 18, which is sealed on one side by disc 16 and on the other by a packing 19 interposed between a second shoulder on the sleeve 17 and the end of the plug 2. Riding freely upon the upper surface of the plunger 15 of the disc 16 is a ball 20. As long as the device is in vertical position this ball will be on top of the plunger and thus directly below the end of the valve stem 6. If the device is allowed to tilt the ball will run off to one side of the disc 16 so that there will be no connection possible between the plunger 15 and the valve stem 6 as the former is raised. Since the spraying operation is of short duration it is not necessary to provide for an automatic shut-off if the device were tilted after being started, since in all practical cases the spraying operation is discontinued before there would be time to displace the device from its vertical position.

As the lifter cam is forced inwardly the valve 3 will be open, allowing liquid under high pressure to pass downward into the chamber 18 and out through a capillary tube 21 which acts as a nozzle. This tube may pass through a hole 22 in the side of the cup 9 or may be turned so as to pass through a notch 23 on the cup's upper edge. The tube should be of sufficiently fine bore to maintain the pressure on the liquid as is well understood. When the knob 13 is released the dished rubber 16 assists by its spring action to return the plunger 15 to its lower position, and as long as the device is held vertical the ball will be in position for a succeeding operation. If the device is tilted sideways the ball will roll out from under the stem 6, and if the device is turned upside down the ball will be directed out of operating position by the downwardly conical top 24 of the chamber 18. If it is desirable to change the type of insecticide before the tank is empty it may be unscrewed, carrying valve 3 with it, and a cap like the ordinary tire valve cap screwed onto plug 2 to prevent the accidental opening of the valve. The tank can thus be removed and replaced at will without loss of pressure, since the valve 3 will remain closed until positively opened by the mechanism within cup 9.

I claim:

A fluid releasing device for use with a refillable pressure container having a poppet valve closing an opening therein, to fit as a unit around the poppet valve stem of said opening, said device having a sealing means for fluid tight attachment to the poppet valve, an opening through said sealing means and a fluid discharge passage in the device in communication with said opening, a slidable plunger mounted in the device and movable toward and away from said discharge passage in axial alignment therewith, a flexible dished diaphragm fixed across said passage and separating the passage from said plunger, said plunger having one end thereof lying against the central portion of said diaphragm, the diaphragm having a concave seat centrally thereof and facing the passage in axial alignment with the latter, a ball freely movable on the surface of said diaphragm, said ball centrally of the diaphragm on said seat being engageable for movement toward and away from said discharge passage and in alignment with the longitudinal axis thereof, a manually operable cam member mounted in the device having the cam surface thereof bearing against the outer end of said slidable plunger for reciprocatory movement of the latter against said diaphragm, and a nozzle outlet communicating with said discharge passage for the release of contents admitted to said passage, said ball when located on said concave seat being in axial alignment with said discharge passage and providing a linkage between said plunger and a valve stem for actuating said stem when the plunger is moved against said diaphragm.

EDWARD D. RAPISARDA.

REFERENCES CITED

The following references are of record in the file of this patent:

UNITED STATES PATENTS

| Number | Name | Date |
|---|---|---|
| 704,529 | Foskett | July 15, 1902 |
| 778,439 | Battelle | Dec. 27, 1904 |
| 1,683,338 | Evinrude | Sept. 4, 1928 |
| 1,771,907 | Abramson | July 29, 1930 |
| 1,911,367 | Kitto | May 30, 1933 |
| 2,194,348 | Zoder | Mar. 19, 1940 |
| 2,330,176 | Kahn | Sept. 21, 1943 |

FOREIGN PATENTS

| Number | Country | Date |
|---|---|---|
| 2,802 | France | June 15, 1904 |
| | (Addition to No. 330,192) | |